UNITED STATES PATENT OFFICE.

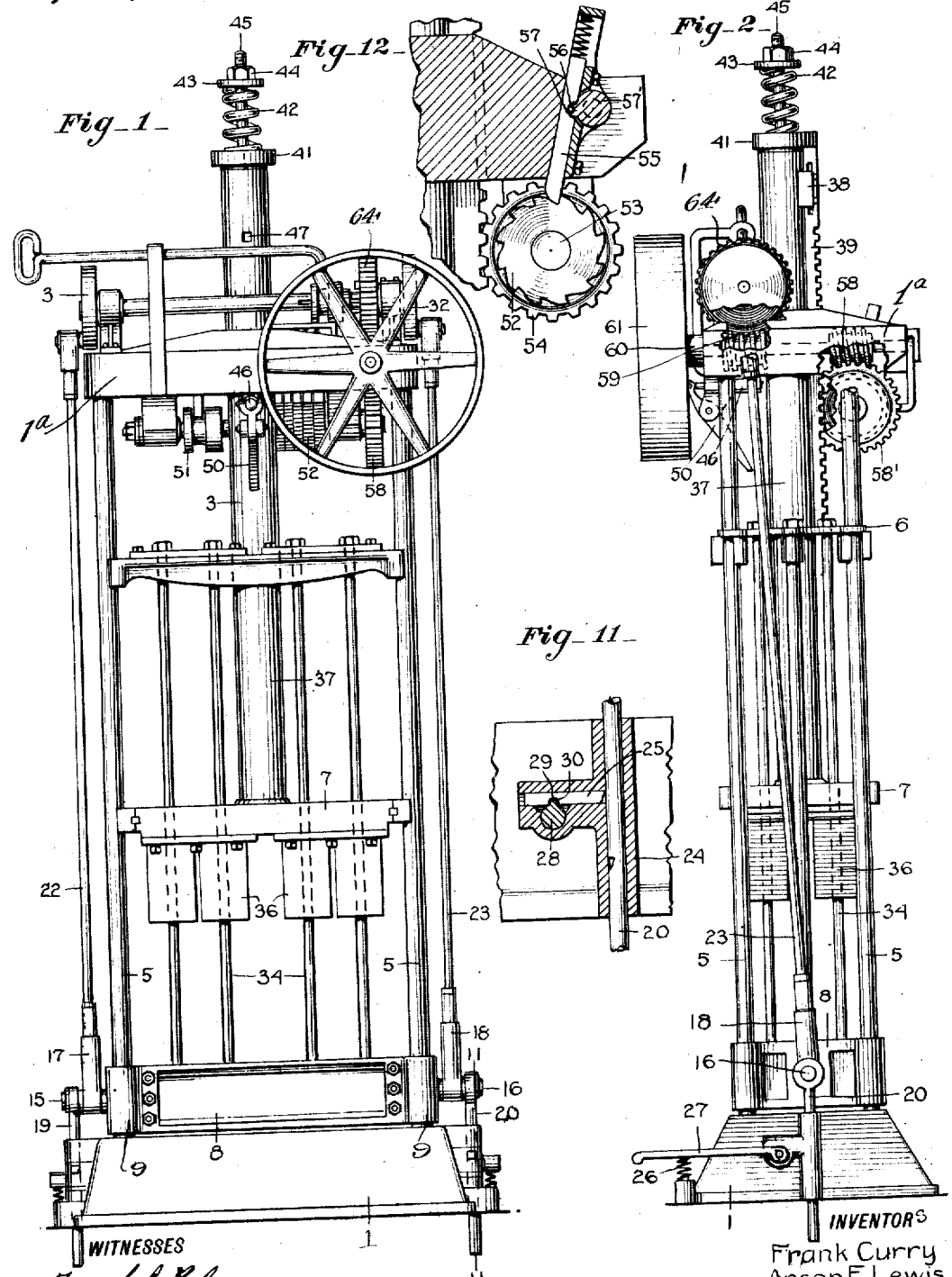

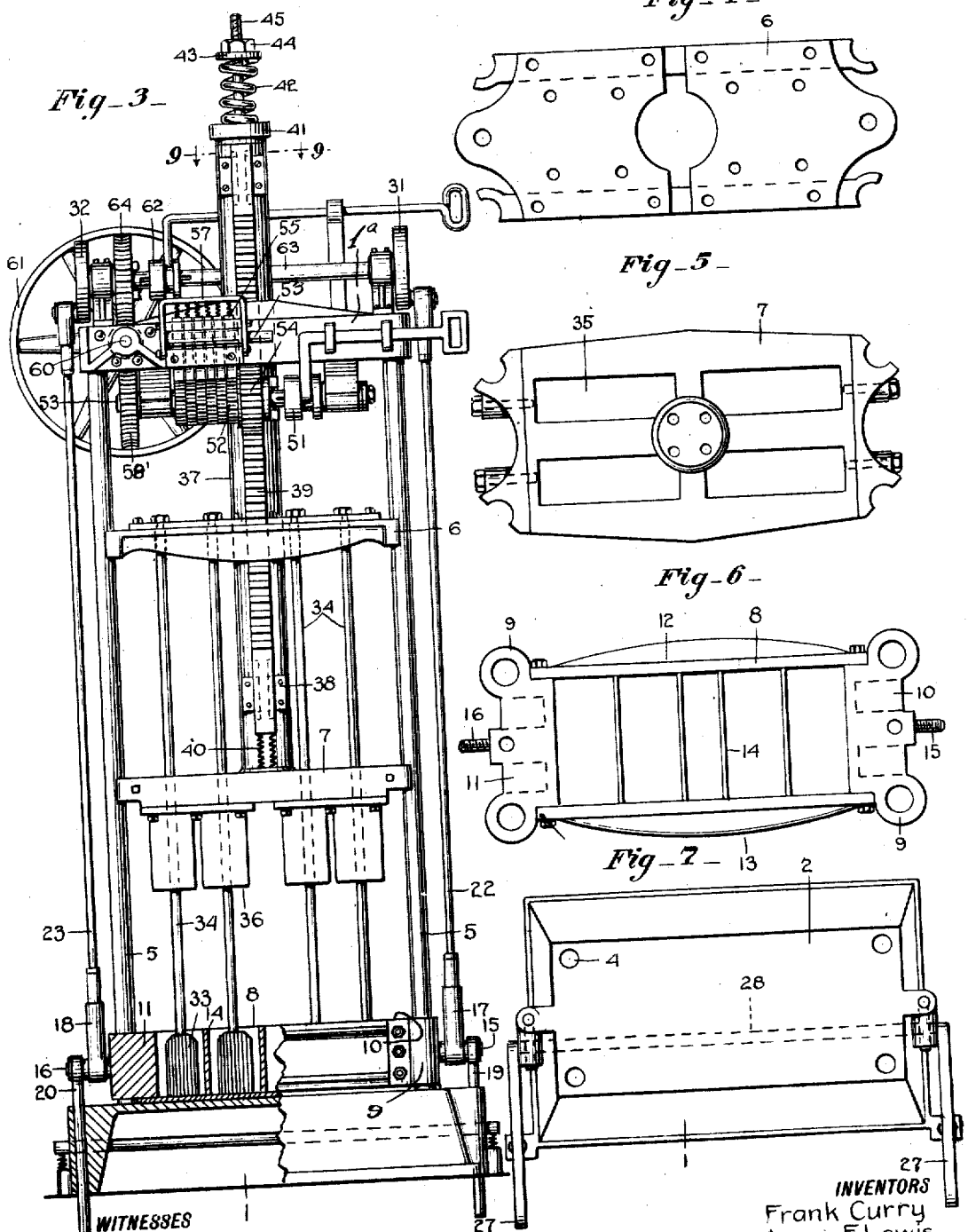

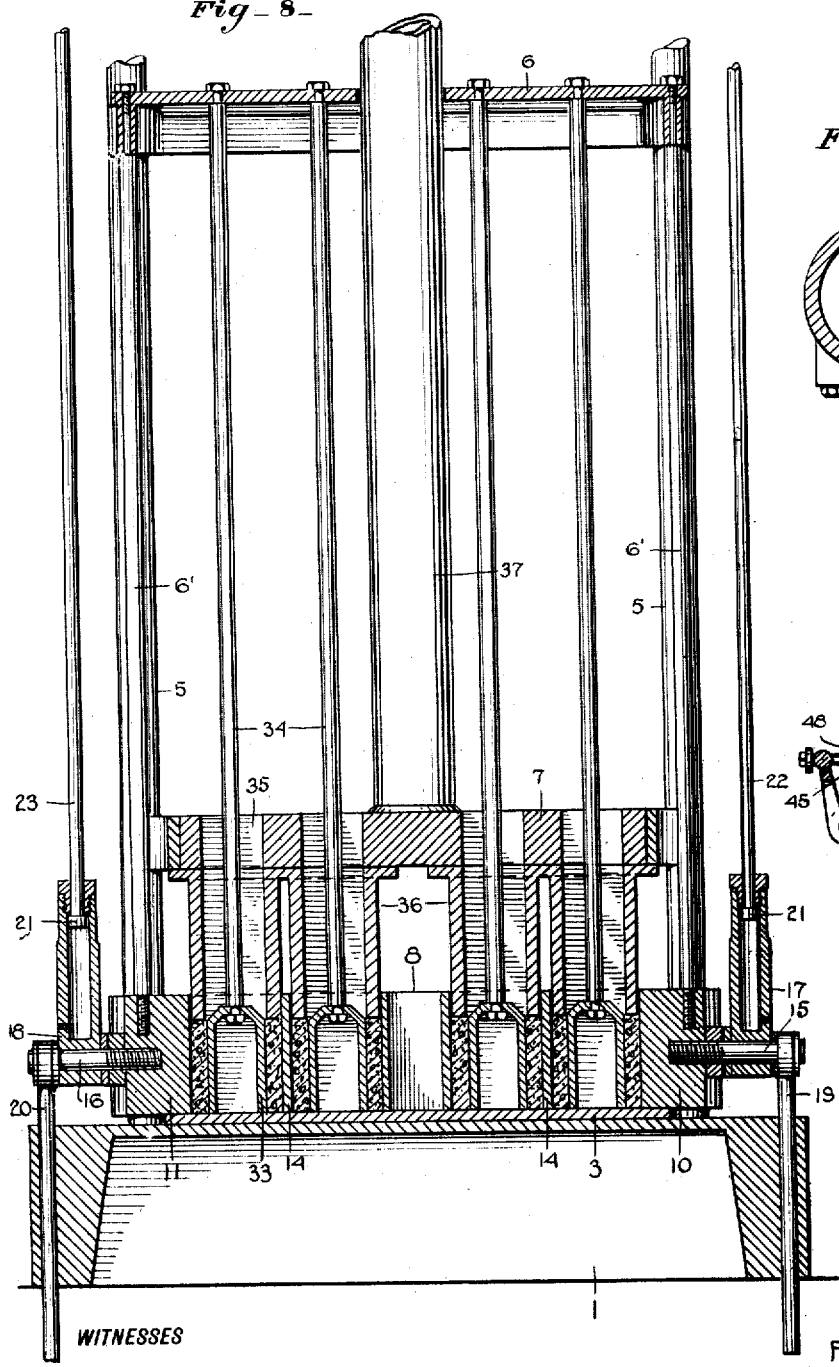
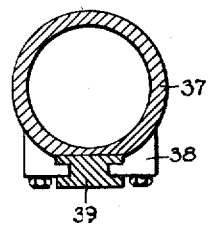
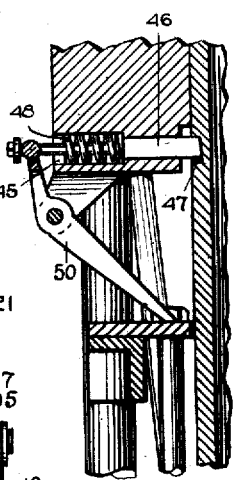

FRANK CURRY AND ANSON F. LEWIS, OF SANTA BARBARA, CALIFORNIA, ASSIGNORS OF ONE-HALF TO WILLIAM E. MOUCK, OF SANTA BARBARA, CALIFORNIA.

MOLDING-MACHINE.

1,267,189.  Specification of Letters Patent.  Patented May 21, 1918.

Application filed August 10, 1917. Serial No. 185,509.

*To all whom it may concern:*

Be it known that we, FRANK CURRY and ANSON F. LEWIS, citizens of the United States, and residents of Santa Barbara, in the county of Santa Barbara and State of California, have invented a new and Improved Molding-Machine, of which the following is a full, clear, and exact description.

This invention relates to molding machines for molding articles from plastic material, as for instance, from concrete, and has for an object the provision of an improved construction whereby an article may be quickly and accurately made.

Another object of the invention is to provide a molding device wherein the article manufactured may be compressed evenly throughout for producing uniform stresses.

A further object of the invention is to provide a molding machine in which the material is given a blow for evenly compressing the same throughout and is finished on the outer and inner surfaces when the article is hollow by a sliding action of the molding members.

In the accompanying drawings:—

Figure 1 is a rear view of a machine disclosing an embodiment of the invention.

Fig. 2 is a side view of the machine shown in Fig. 1.

Fig. 3 is a front view of the machine shown in Fig. 1, certain parts being broken away for better illustrating the structure.

Fig. 4 is a top plan view of a core rack.

Fig. 5 is a top plan view of a die plate.

Fig. 6 is a top plan view of a form or mold.

Fig. 7 is a top plan view of the base of the machine shown in Fig. 3.

Fig. 8 is an enlarged sectional view through the lower part of the machine shown in Fig. 3, the same illustrating the arrangement of the different molding devices for shaping the article.

Fig. 9 is an enlarged detail fragmentary sectional view through Fig. 3 on line 9—9.

Fig. 10 is an enlarged detail fragmentary sectional view showing the arrangement of catch for holding the rammer or plunger in a depressed position.

Fig. 11 is an enlarged detail fragmentary sectional view showing the arrangement of catch and release, the same being taken approximately on line 11—11 of Fig. 1.

Fig. 12 is a detail fragmentary sectional view through the system of pawls and associated device disclosing certain features of the invention.

Referring to the accompanying drawings by numerals, 1 indicates a base which may be cast or formed in any suitable manner, said base having a flat surface 2 on which the article is formed and which may receive a pallet 3 if desired, though this is not necessary. The base 1 is provided with a number of apertures 4 for accommodating the uprights 5, there being four apertures and four uprights shown. These uprights are preferably fastened rigidly to the base 1 and to the top frame 1ª and act as guides for the core plate 6 and the die plate 7, as well as supports for the upper operating mechanism hereinafter fully described. In addition, the uprights 5 act as guides for the mold or form 8, which mold or form is provided with a number of tubular portions 9, as shown in Fig. 6, surrounding the various uprights. Preferably the form 8 may be made with end members 10 and 11, side members 12 and 13 and a number of partitions 14, said partitions being fitted in any suitable manner into the side members, as for instance, by being arranged in grooves therein. The form or mold 8 shown in Fig. 6 is designed to provide four bricks, though it is evident that a greater or less number of bricks could be molded, or articles of other kinds could be molded, as for instance, slabs, pipes, troughs or the like.

The ends 10 and 11 of the mold 8 are provided with stub shafts 15 and 16 which accommodate the bearing members 17 and 18 and the ends of rods 19 and 20. The bearing members 17 and 18 are hollow for part of their length, as shown in Fig. 8, so as to allow the head or piston 21 of each of the rods 22 and 23 to slide freely back and forth when the form has been raised a predetermined distance and held in that position, as for instance, a distance equal to the length of the hollow part of members 17 and 18. This length is sufficient to allow the ready removal of the molded article from base 1. In connection with raising the mold 8, the rods 19 and 20 are used for supporting the same in a raised position, (notwithstanding any movement of rods 22 and 23) said rods being provided with notches 24, as shown in Fig. 11, into which the bolts 25 snap by reason of the action of the respective springs 26 acting on the hand lever 27, which hand lever is rigidly secured to shaft 28 and said shaft is provided with a tooth 29 fitting into a suitable socket 30 and the respective bolts 25. When the mold is elevated for the full distance the bolts 25 snap into the notches 24 and, consequently, prevent the return movement of the mold until the operator places his foot on the lever 27 and rocks the shaft 28, whereupon both of the bolts 25 are withdrawn and the mold is allowed to move down to its position on the base 1 as shown, for instance, in Fig. 8.

The mold is elevated by having the heads or pistons 21 engage the upper end of members 17 and 18 and move said members and the mold upward as the rods 22 and 23 are elevated by the wheels 31 and 32, said rods being pivotally connected with said wheels. As shown in Fig. 3, the pivotal connection of rods 22 and 23 is at their lowermost point and when the wheels 31 and 32 rotate for half a revolution the pivotal members will be at their highest point so that the bolts 25 may snap into the notches 24. As the wheels 31 and 32 continue to rotate the heads 21 on rods 22 and 23 merely move back and forth in the hollow bearing members 17 and 18.

Associated with the mold 8 are a plurality of core members 33, each of said core members being connected to a rod 34. The rods 34 extend through openings 35 in the die plate 7 and also through suitable openings in the core plate 6, by what is known as a shoulder and body fit. Preferably the rods are held in place by suitable nuts so that when the mold 8 is raised the cores 33 will be raised the same distance as the mold, as the mold is connected to plate 6 by rods 6', as shown in Fig. 8. The idea is to raise these members out of the way, whereby the finished article may be removed in a horizontal direction. Associated with the mold 8 and the cores 33 is the die plate 7 carrying dies 36, which dies may be provided with flanges for receiving bolts, whereby the dies may be rigidly secured to the die plate 7. The lower end of the dies 36 are preferably of the same shape as the article being formed, so that the dies may hold the article against movement while the mold 8 and cores 33 are being raised as hereinafter described, whereby the outside and inside of the articles will be surfaced or smoothed and thereby given a very desirable finish.

In order to elevate the die plate 7 a plunger or ram 37 is rigidly connected thereto. The plunger 37 is provided with a plurality of guides 38 (Figs. 3 and 9) which guide the rack 39, said rack being connected by springs 40 to the plate 7, while the rack at its opposite end is connected with a loose collar secured to a plate 41 extending across the top of the plunger 37. A spring 42 rests on plate 41 and bears against a washer 43 which is held in place by a nut 44, said nut being carried by a rod 45 which extends loosely through the plate 41 and is rigidly secured in any suitable manner to the upper end of plunger 37. By this construction and arrangement the rack 39 is held properly in place and yieldingly transmits power to the plunger 37.

To raise the plunger 37 the clutch 51 on shaft 53 is thrown into engagement, whereupon the ratchet wheels 52, which are rigidly secured to gear 54 and loosely mounted on shaft 53, will rotate and will also rotate the gear wheel 54, said rotation being in such direction as to raise the rack 39 and the plunger 37 connected therewith, together with the parts carried thereby, gear wheel 54 being continually in mesh with rack 39. The clutch 51 is allowed to remain in engagement with the wheel 54 until the plunger 37 and associate parts have been raised to the desired position and is then disconnected. Each of the ratchet wheels 52 is provided with an independent reciprocating spring-pressed pawl 55 (Fig. 12) co-acting with the ratchet wheels 52. Each of these pawls is provided with a socket or notch 56 accommodating the tooth 57 of a rotatable, or, rather, a rock shaft 57', whereby when shaft 57' is rocked in one direction the pawls will be lowered, as shown in Fig. 12, and when rocked in the opposite direction the pawls will be disengaged from the ratchet wheel 52 so that the ratchet wheels and associated parts are free to rotate under the action of gravity and allow the dies to fall so as to give a sudden blow to the article being molded. It is of course understood that the clutch 51 is disengaged when the pawls 55 have been withdrawn from the ratchet wheels. A suitable handle may be connected with shaft 57' for shifting the same or, if desired, a hand operated wheel could be connected therewith.

The shaft 53 which drives the clutch 51 is rigidly secured to a worm wheel 58', said worm wheel meshing with the worm 58, as shown in Fig. 2. Worms 58 and 59 are rigidly secured to a power shaft 60, said power shaft receiving power from a pulley 61, which pulley receives power from any suitable source. Preferably the power wheel 61, worms 58 and 59 and shaft 60 are continually rotating as long as the device is in operation, whereas the moving parts of the device which are used in forming the article are intermittently operated by reason of the shifting of the clutches 51 and 62, clutch 62 being splined on shaft 63 and arranged to engage the worm wheel 64 meshing with worm 59. When this clutch is in engagement with the worm wheel 64 the wheels 31 and 32 are operated and the parts connected therewith, while the clutch 51 is used for causing the plunger 37 and associated parts to be raised.

When it is desired to allow the dies 36 and associated parts to drop under the action of gravity for giving a sudden blow to the concrete or other material being used, shaft 57' is partially rotated for withdrawing the pawls 55 from engaging with the ratchet wheels 54, (clutch 51 having previously been disengaged) whereupon the ratchet wheels and associated parts are loose and, consequently, the weight of the dies and associated parts will cause the dies to move down quickly and strike the concrete. The sudden striking of the concrete will cause an even stress throughout the concrete and an even distribution of moisture. When the plunger 37 reaches its lowermost position and compress the concrete as described, a bolt or pin 46 will snap into the opening 47 and lock the dies in their lowered position. The bolt or pin 46, as shown in Fig. 10, is slidingly mounted in the top frame 1ª and is continuously pressed by spring 48 so as to snap into the notch or aperture 47 and plungers 37 whenever said plunger has been lowered to the proper position. A lever 50 is pivotally mounted on a suitable bracket connected with the top frame 1ª, said lever being positioned so that one end will act on the pin or rod 46 for withdrawing said rod whenever the plates 6 have been raised to such an extent to move the lower end of the lever upwardly. This takes place when the mold is elevated by the rods 22 and 23. This locking arrangement for holding the plunger 37 and associate parts in their lowered position is provided so that the dies 36 will hold the bricks or other articles being formed while the cores 34 and form 8 are raised. When it is desired to elevate the dies the pawls 55 are brought back manually into engagement with the ratchet wheel 52 and the clutch 51 is then thrown into engagement whereupon the plunger 37 and dies 36 will be elevated to any desired height. After the plunger has reached the desired height the clutch 51 is manually disengaged and the pawls 55 and associate parts will support the plunger and dies against a downward movement.

In operation when the dies and also the molds and cores are in the elevated position above described, the first movement is to depress the lever 27 so that the mold or form 8 may move downwardly to a position in engagement with the base. This downward movement of the mold will also cause the cores to move downwardly, it being assumed that the rods 22 and 23 are in a lowered position. The concrete is then applied to the molds and the plunger 37 released so as to fall by gravity and cause the dies 36 to strike the cement or other mixture in the space around the cores 33 and drive the cement or other mixture into the space around the cores to within the number of inches of the bottom of the cores as the brick being manufactured is high. For instance, the brick may be half as high as the mold, as shown in Fig. 3, or any other desired height as preferred, so that when the dies 36 fall by gravity the mixture is pressed and the lower ends of the dies are below the upper edge of the mold. As soon as the dies 36 move down to their extreme lowered position the pin or bolt 46 snaps into the aperture 47 so as to lock the plunger 37 and the cores in their lowered position. The clutch 62 is then thrown into operation and rods 22 and 23 move upwardly until the catches 25, (for instance Fig. 11), snap into the rods 19 and 20. The rods 22 and 23 may continue to move up and down in the hollow members or sleeves 17 and 18, but the mold will be held elevated together with the cores as the cores are moved simultaneously with the mold by reason of the plates 6 and the rod 5. As the core and mold move upwardly simultaneously a wiping or smoothing action will be given to the inside and outside of the brick for giving a nicer and better finish. The upward movement of the plate 6 will disengage the pin 46 so that clutch 51 may be thrown in and the dies 36 raised to the position shown in Fig. 3, or to any other desired position, so that the article molded will be perfectly free from the dies, mold and cores, whereby the pallet and the articles molded may be removed in a horizontal direction; afterward the process of operation may be repeated for another batch.

What we claim is:

1. In a molding machine of the character described, a base, a mold adapted to be arranged on said base, a die for compressing the material in said mold, means for elevating said die, manually actuated means for releasing said die after it has been elevated so that the die will drop by gravity and compress the material in said mold, a pair of reciprocating rods, a connection for each of said rods connecting the rods with said mold, each of said connections comprising a pivotally mounted member connected with the rod formed hollow for a predetermined length, said hollow portion accommodating an enlargement on the rod associated therewith, said hollow portion being of the same length as the length of reciprocation of said rod whereby the upward movement of said rods will elevate the mold while the downward movement may be had without affecting the mold, and means for locking the mold in its raised position.

2. In a molding machine of the character described, a base, a mold arranged on the base, a die for compressing the material in the mold, a plunger connected with said die, a rack slidingly mounted on said plunger, spring means for connecting the rack and the plunger, means acting on the rack for raising the plunger and the die, and a manually operated member for releasing said means whereby said die, plunger and associated parts may move downwardly and permit the die to strike the material in the mold.

3. In a molding machine of the character described, a base, a mold arranged on said base, a plurality of uprights extending from said base, a die for compressing the material in the mold, said die being guided in its movement by said uprights, said die being provided with a plurality of openings, a plurality of rods extending through said openings, a core arranged on each of said rods and normally positioned in said mold, a core plate arranged above said die, means for connecting said rods to said core plate, said core plate being formed with members partially surrounding said uprights, and means for raising said die.

4. In a molding machine of the character described, a base, a mold adapted to be positioned on said base, a gravity actuated die for compressing the material placed in the mold, a plunger for supporting said die, a rack resiliently connected with said plunger, a gear wheel meshing with said rack, a power mechanism, a clutch for connecting said power mechanism with said gear, whereby said rack and plunger is raised, a ratchet wheel connected with said gear, and a manually operated pawl connected with said ratchet wheel for normally preventing a reverse rotation thereof whereby the plunger and associate parts are held elevated until said ratchet wheel has been released.

5. In a molding machine of the character described, a base, a mold adapted to be arranged on said base, means for holding said mold in position, said means acting as guides whereby the mold is always directed to the proper position on said base, a pair of sleeve members connected with said mold, said sleeve members having shoulders near the upper part, a piston arranged in each of said sleeves, a rod connected with each of said pistons, a rotatable driving wheel connected with each of said rods, said driving wheels being substantially the same diameter as said sleeves are long whereby the mold will be raised and lowered as the wheel is rotated, a catch associated with said mold for holding the same in an extremely elevated position when moved thereto by said wheels whereby the piston will reciprocate in said sleeves during a continuous rotation of said wheels, a die for said mold, means for raising said die to a position above the mold, and means for releasing the die whereby the die may drop by gravity for compressing the contents of said mold.

6. In a molding machine of the character described, a base, a mold adapted to be positioned on said base, a gravity actuated die for compressing material in said mold, a plunger for supporting said die, a rack connected with said plunger, a gear meshing with said rack, a plurality of ratchet wheels connected with said gear, a pawl for each of said ratchet wheels, a guiding structure for supporting said pawls, springs for causing said pawls to remain normally in engagement with said ratchet wheel, a rotatable shaft provided with a tooth engaging the notches in the pawls, whereby the pawls are simultaneously raised upon the rotation of the shaft, a manually actuated lever for rotating said shaft, power means arranged adjacent said gear, said power means including a shaft, and a clutch driven by said shaft adapted to be interlocked with said gear for rotating the same.

FRANK CURRY.
ANSON F. LEWIS.